Patented July 22, 1947

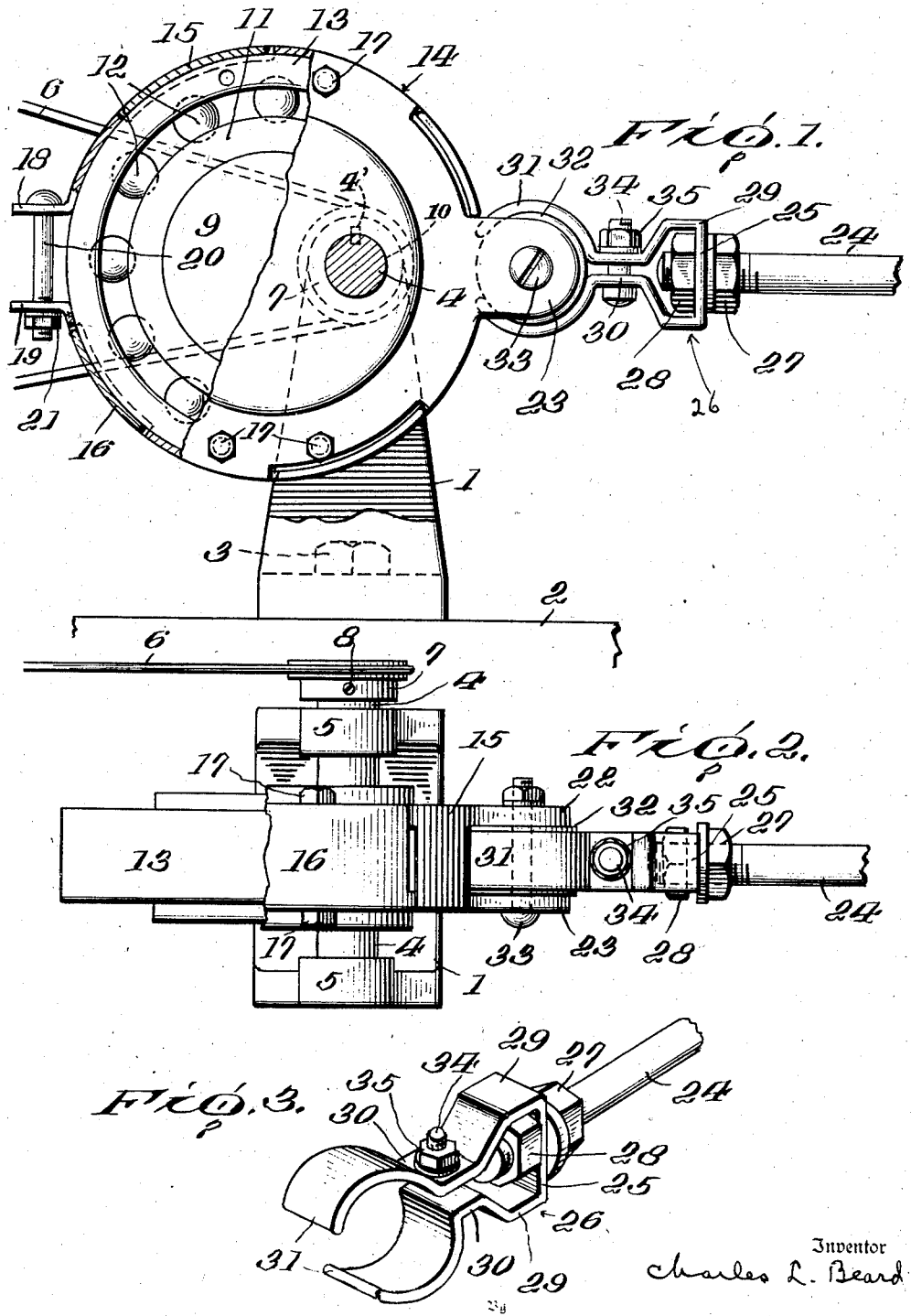

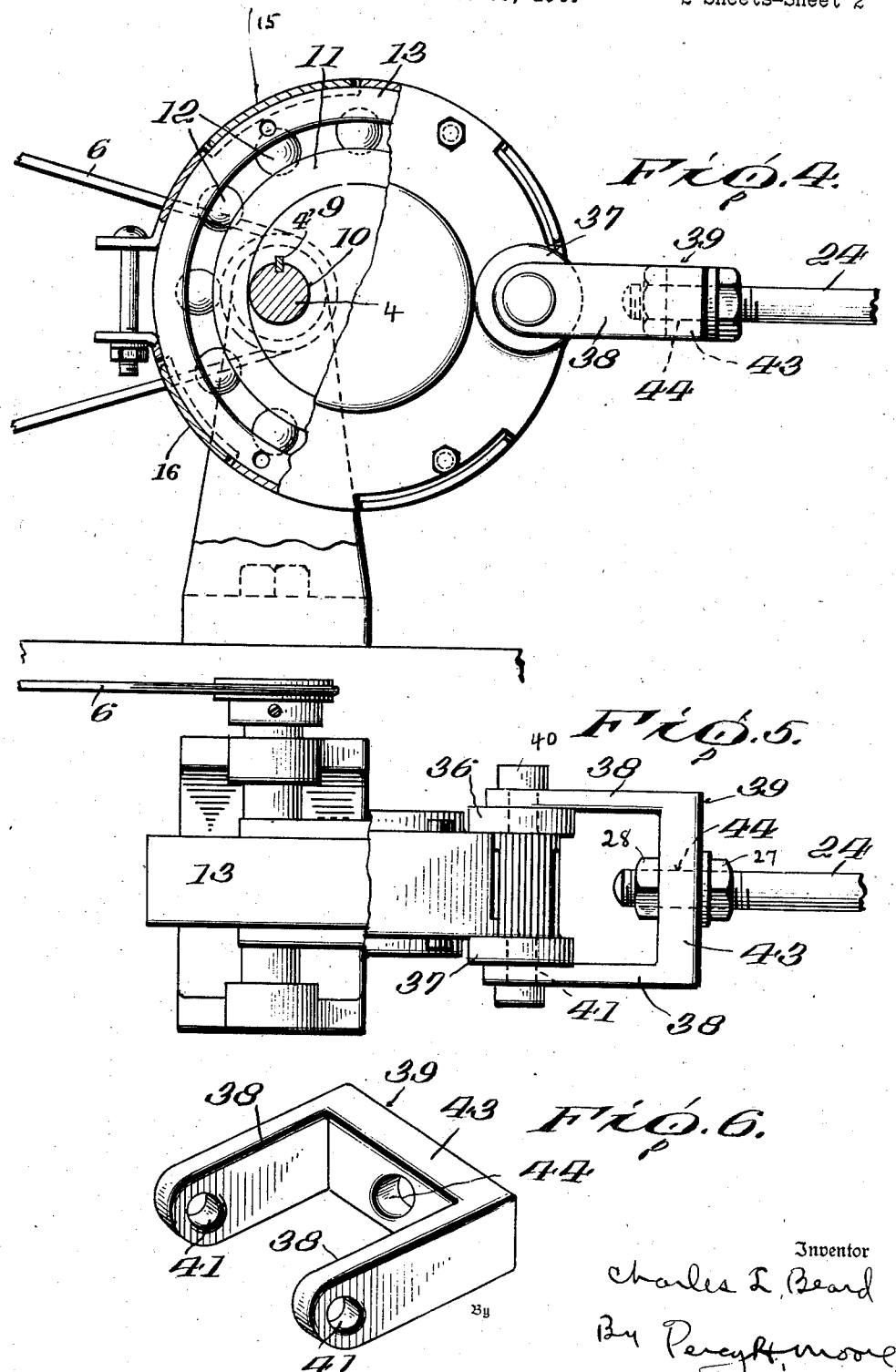

2,424,532

UNITED STATES PATENT OFFICE 2,424,532

ECCENTRIC DRIVING CONNECTION

Charles L. Beard, Lancaster, Pa.

Application November 30, 1944, Serial No. 565,969

3 Claims. (Cl. 74—44)

My invention relates to eccentric driving connections adapted to convert the rotative movement of a drive shaft into the reciprocatory movement of a pump piston, or other part, which the user desires to actuate.

An object of the invention is to provide an economical and efficient drive assembly composed of relatively few working parts, easy to manufacture and assemble, and which operates with a minimum of friction.

Other objects and advantages will be apparent from the following description, reference being had to the accompanying drawings, wherein a preferred form as well as a modified form of embodiment of the present invention are shown.

In the drawings:

Figure 1 is a side elevation of the invention;

Figure 2 is a top plan view of the assembly shown in Figure 1;

Figure 3 is a detail perspective of the clamp connection between the driven shaft and the eccentric;

Figure 4 is a side elevation of a modified form of the invention;

Figure 5 is a top plan view of the modification shown in Figure 4; and

Figure 6 is a detail perspective of the yoke member connecting the eccentric with the driven shaft.

Referring more particularly to Figures 1, 2 and 3 of the drawings numeral 1 denotes a bracket or other suitable support adapted to be secured to a floor, wall or the like 2, by means of bolts 3, only one of which is shown. A drive shaft 4, is rotatably mounted in bearings 5, formed on the support 1, and this shaft is rotated by a V-belt 6, which passes over a grooved collar 7, fixed to the shaft 4, as at 8, and is operatively connected to a motor not shown. An eccentric 9 is keyed to the shaft 4, for rotation therewith, as at 4', an opening 10 in the eccentric 9, disposed at one side of the center thereof being provided for receiving the shaft.

An annular ball race 11 surrounds and is fixed to the disk or eccentric 9 and a plurality of balls 12 are disposed between this ball race 11 and a second or outer ball race 13, secured to a casing 14. The casing 14 comprises two interfitting flanged circular members 15 and 16 connected together and to the outer ball race 13 by bolts 17. The casing members 15 and 16, are respectively formed with forwardly extending offset portions 18 and 19, adapted to receive a threaded bolt 20. When a nut 21 is screwed home on the bolt 20, the members 15 and 16 will be clamped tightly together about the outer race member 13, in an obvious manner. The casing members 15 and 16 are also respectively formed with forwardly projecting apertured ears 22 and 23 for a purpose presently described.

Rotative movement of the drive shaft 4 is converted into reciprocatory movement by means of a connecting rod 24 suitably connected at its outer end to a pump piston or any other member, not shown, which the user desires to reciprocate. The inner threaded end of the rod 24 extends through an opening, not shown, formed in the body portion 25, of a resilient clamp member 26, and is secured thereto by lock nuts 27 and 28. The clamp member 26, which is made of resilient metal, includes two irregularly bent arms 29, projecting at right angles from the body portion 25. These arms are inwardly bent intermediate their length, as at 30, and terminate in curved or arcuate portions 31, which latter are adapted to frictionally embrace the outer race of an anti friction bearing 32, clamped between the previously mentioned apertured ears 22 and 23 by means of a bolt 33. A bolt 34 and nut 35 serve to pull the resilient arms 29 towards each other and to clamp the arcuate portions 31 of the clamp member 26 tightly about the bearing 32, after the parts have been assembled. To facilitate assembly the nut 35 is removed and arms 29 manually spread apart for the reception of the bearing 32. When released the arms will automatically spring inwardly towards each other and into gripping position. The bolt 34 and nut 35 insure a close connection and also prevent accidental separation of the spring arms.

In Figures 4, 5 and 6, wherein a modified form of the invention is disclosed, the casing members 15 and 16 are formed with apertured anti friction members 36 and 37, respectively, to which the arms 38 of a U-shaped coupling member 39, are secured, by means of headed pins or screws 40, adapted to pass through openings 41 in the coupling member and which are fitted tightly to the inner race of the anti frictional members 36 and 37. The body portion 43 of the coupling member is formed with an opening 44 through which one end of the connecting rod 24 extends, clamping nuts 27 and 28 being employed to secure these parts together, as in the preferred form. The free end of the rod 24 is adapted to be suitably connected to the part or member to be reciprocated.

It will be apparent that when the shaft 4 is rotated the eccentric 9 and the inner ball race 11, will be rotated with respect to the outer race 13, and about the shaft as a fixed pivot, and that the connecting rod 24 will be reciprocated in a horizontal plane thus causing the piston or other part pivotally connected to the outer end of the rod 24 to be reciprocated. The pivotal connection between the resilient clamp member 26 and the bearing 32, permits of the outer race 13 and casing 14 being rocked with respect to the clamp 26 and rod 24. Likewise the same freedom of movement exists between the coupling member 39 and rod 24 with respect to the outer race and the casing.

It is obvious that the bracket 1 can be so mounted that the connecting rod 24 will be reciprocated in a vertical plane.

Having thus described my invention, what I claim is:

1. An eccentric attachment of the character described comprising a shaft, an eccentric mounted upon the shaft and comprising a circular disk having an opening at one side of the center thereof, for receiving the said shaft, the latter being keyed in the said opening to impart rotary motion to the disk when the shaft is rotated, inner and outer spaced races, said inner race embracing and fixed to said eccentric, a casing comprising interfitting circular members connected together and to the outer race, rearwardly projecting ears formed on said casing and having a race positioned therebetween, a connecting rod, a resilient clamp carried by one end of said rod, spaced arms on said clamp engageable with said last mentioned race for connecting the inner end of said rod pivotally to said casing members.

2. An eccentric attachment of the character described comprising a shaft, an eccentric mounted upon the shaft and comprising a circular disk having an opening at one side of the center thereof, for receiving the said shaft, the latter being keyed in the said opening to impart rotary motion to the disk when the shaft is rotated, inner and outer spaced races, said inner race embracing and fixed to said eccentric, a casing comprising interfitting circular members connected together and to the outer race, rearwardly projecting ears formed on said members, a bearing member supported between said projecting ears, a connecting rod, and a resilient clamp carried by one end of said rod, and spaced arms on said clamp engageable with said bearing member for pivotally connecting the rod thereto.

3. An eccentric attachment according to claim 2 wherein the clamp comprises two resilient arms having curved ends adapted to frictionally embrace the second disk.

CHARLES L. BEARD.

REFERENCES CITED

The following references are of record in the file of this patent:

UNITED STATES PATENTS

| Number | Name | Date |
|---|---|---|
| 1,314,322 | Freeman | Aug. 26, 1919 |
| 2,102,196 | Craske | Dec. 14, 1937 |